(12) United States Patent
Cronin et al.

(10) Patent No.: US 12,246,284 B2
(45) Date of Patent: Mar. 11, 2025

(54) SYSTEMS AND METHODS FOR PLASMA-BASED REMEDIATION

(71) Applicants: UNIVERSITY OF SOUTHERN CALIFORNIA, Los Angeles, CA (US); TAI CHONG CHEANG STEAMSHIP CO. (H.K.) LIMITED, Hong Kong (CN)

(72) Inventors: Stephen B. Cronin, Los Angeles, CA (US); Sriram Subramanian, Los Angeles, CA (US); Tom Huiskamp, Los Angeles, CA (US); Alec Nystrom, Los Angeles, CA (US); William Schroeder, Los Angeles, CA (US)

(73) Assignees: UNIVERSITY OF SOUTHERN CALIFORNIA, Los Angeles, CA (US); TAI CHONG CHEANG STEAMSHIP CO. (H.K.) LIMITED, Hong Kong (CN)

( * ) Notice: Subject to any disclaimer, the term of this patent is extended or adjusted under 35 U.S.C. 154(b) by 632 days.

(21) Appl. No.: 17/437,683

(22) PCT Filed: Mar. 11, 2020

(86) PCT No.: PCT/US2020/022172
§ 371 (c)(1),
(2) Date: Sep. 9, 2021

(87) PCT Pub. No.: WO2020/185951
PCT Pub. Date: Sep. 17, 2020

(65) Prior Publication Data
US 2022/0184551 A1     Jun. 16, 2022

Related U.S. Application Data

(60) Provisional application No. 62/816,694, filed on Mar. 11, 2019.

(51) Int. Cl.
*B01D 53/32*     (2006.01)
*B01D 53/92*     (2006.01)
*F01N 3/08*      (2006.01)

(52) U.S. Cl.
CPC ............. *B01D 53/32* (2013.01); *B01D 53/92* (2013.01); *F01N 3/0892* (2013.01);
(Continued)

(58) Field of Classification Search
None
See application file for complete search history.

(56) References Cited

U.S. PATENT DOCUMENTS 1,357,201 A * 10/1920 Nesbit .................. B03C 3/41
                                              55/DIG. 38
3,157,479 A    11/1964 Boles et al.
(Continued)

FOREIGN PATENT DOCUMENTS

CN     200984492 Y    12/2007
CN     101496987 A     8/2009
(Continued)

OTHER PUBLICATIONS

WO2006126720A1_ENG (IP.com machine translation of Kaikinohana) (Year: 2006).*
(Continued)

*Primary Examiner* — Youngsul Jeong
(74) *Attorney, Agent, or Firm* — Fulwider Patton LLP (57) ABSTRACT

A system for exhaust gas remediation includes an engine, a plasma reactor, and a pulse source. The engine emits exhaust gas that includes NO molecules and NOx molecules. The plasma reactor includes an internal chamber that is fluidly connected to the engine such that the exhaust gas flows into the internal chamber. An electrode is disposed within the internal chamber of the plasma reactor. The electrode is
(Continued)

electrically coupled to an electrical pulse source. The electrical pulse source delivers electrical pulse to the electrode to form a plasma from the exhaust gas, which removes at least a portion of the NO molecules and at least a portion of the NOx molecules.

11 Claims, 11 Drawing Sheets

(52) U.S. Cl.
CPC ............................ *B01J 2219/0809* (2013.01); *B01J 2219/0815* (2013.01); *B01J 2219/0824* (2013.01); *B01J 2219/0849* (2013.01); *F01N 2240/28* (2013.01); *H05H 2245/17* (2021.05)

(56) References Cited

U.S. PATENT DOCUMENTS

| | | | |
|---|---|---|---|
| 3,423,664 A | 1/1969 | Dewey | |
| 3,475,123 A * | 10/1969 | Hoekje | C01G 23/07 |
| | | | 423/614 |
| 3,660,715 A * | 5/1972 | Post | H01J 37/32 |
| | | | 313/230 |
| 3,875,922 A | 4/1975 | Kirmss | |
| 4,247,307 A * | 1/1981 | Chang | B03C 3/41 |
| | | | 95/79 |
| 4,678,888 A * | 7/1987 | Camacho | H05H 1/3405 |
| | | | 219/121.57 |
| 5,725,822 A | 3/1998 | Keller et al. | |
| 6,224,837 B1 | 5/2001 | Okamoto et al. | |
| 2004/0000475 A1 | 1/2004 | Cho et al. | |
| 2004/0200811 A1 | 10/2004 | Linjewile et al. | |
| 2005/0126159 A1 | 6/2005 | Cho et al. | |
| 2007/0028603 A1* | 2/2007 | Igarashi | F01N 13/017 |
| | | | 60/275 |
| 2007/0261556 A1* | 11/2007 | Kasai | F01N 3/021 |
| | | | 96/74 |
| 2007/0266702 A1 | 11/2007 | Cotton | |
| 2018/0215639 A1 | 8/2018 | Locke et al. | |
| 2022/0152553 A1 | 5/2022 | Cronin et al. | |

FOREIGN PATENT DOCUMENTS

| | | | | |
|---|---|---|---|---|
| CN | 106039945 A | 10/2016 | | |
| CN | 107433132 A | 12/2017 | | |
| CN | 113785119 A | 12/2021 | | |
| CN | 114173907 A | 3/2022 | | |
| EP | 1173385 A0 | 11/2000 | | |
| EP | 1541821 A1 | 6/2005 | | |
| EP | 3130773 A1 * | 2/2017 | ............ | B01D 53/323 |
| EP | 3938081 A1 | 1/2022 | | |
| EP | 3938644 A2 | 1/2022 | | |
| JP | H10325 A | 1/1998 | | |
| JP | 2006138227 A * | 6/2006 | | |
| JP | 2013050071 A * | 3/2013 | ............ | Y02T 10/12 |
| JP | 2022-524631 A | 5/2022 | | |
| JP | 2022-525132 A | 5/2022 | | |
| KR | 20100081600 A | 7/2010 | | |
| KR | 20210134761 A | 11/2021 | | |
| KR | 20210136091 A | 11/2021 | | |
| SG | 11202109812 | 10/2021 | | |
| SG | 11202109996 R | 10/2021 | | |
| WO | WO-2006126720 A1 * | 11/2006 | ............ | B01D 53/56 |
| WO | 2010/011408 A1 | 1/2010 | | |
| WO | 2020/185951 A2 | 9/2020 | | |
| WO | 2020/185966 A1 | 9/2020 | | |

OTHER PUBLICATIONS

JP2013050071A_ENG (Espacenet machine translation of Tanaka) (Year: 2013).*
JP2006138227A_ENG (Espacenet machine translation of Tsuchiya) (Year: 2006).*
International Search Report and Written Opinion for PCT/US2020/022172 dated Sep. 1, 2020, 13 pages.
International Search Report and Written Opinion for PCT/US2020/022189 dated Jun. 19, 2020, 11 pages.
Fujii et al., Removal of Nox by DC Corona Reactor with Water, Journal of Electrostatics, 2001, vol. 51, pp. 8-14.
Kuroki et al., Single-Stage Plasma-Chemical Process for Particulates, NO/sub x/, and SO/sub x/ Simulataneous Removal, IEEE Transactions on Industry Applications, 2002, vol. 38(5), pp. 1204-1209.
Mohapatro et al., Abatement of NOx using Compact High Voltage Pulse Power Supply: Towards Retrofitting to Automobile Vehicle, IEEE Transactions on Dielectrics and Electrical Insulation, 2017, vol. 24(5), pp. 2738-2745.
Sakugawa et al., Investigation of Preionization Effects in Atmospheric Pulsed Discharge, IEEE Transactions on Plasma Science, 2014, vol. 42(11), pp. 3633-3638.
Schroeder et al., Plasma-Enhanced SO2 Remediation in Humidified Gas Matrix: A Potential Strategy for the Continued Burning of High-Sulfur Bunker Fuel, Fuel 274, 2020, pp. 1-4.
International Preliminary Report on Patentability for PCT/US2020/022172 dated Sep. 23, 2021, 9 pages.
EP 20769320.1 Partial European Search Report dated Dec. 2, 2022, 26 pages.
EP 20769320.1 Extended European Search Report dated Mar. 6, 2023, 12 pages.
SG 11202109812Q A Search Report and Written Opinion dated Jan. 4, 2023, 10 pages.
International Preliminary Report on Patentability for PCT/US2020/022189 dated Sep. 23, 2021, 9 pages.
EP 20769477.9 Extended European Search Report dated Dec. 23, 2022, 16 pages.
Abolmasov et al., Negative corona in silane-argon-hydrogen mixtures at low pressures, J. Phys. D: Appl. Phys. 41 (2008) 165203, pp. 1-6.
Stancampiano et al., Plasma and Aerosols: Challenges, Opportunities and Perspectives, Appl. Sci. 2019, 9, 3861, pp. 1-10.
Yan et al., A High-Voltage Pulse Generator for Corona Plasma Generation, IEEE Transactions on Industry Applications, 38(3), 2002, pp. 866-872.
Yamamoto et al., Performance Evaluation of Nonthermal Plasma Reactors for NO Oxidation in Diesel Engine Exhaust Gas Treatment, IEEE Transactions on Industry Applications, 39, 2003, pp. 1608-1613.
Wang et al., Solid-State High Voltage Nanosecond Pulse Generator, IEEE, Pulsed Power Conference, 2005, pp. 1199-1202.
Poulain et al., The plasma levitation of droplets, Appl. Phys. Lett. 107, 064101, 2015, pp. 1-4.
Written Opinion for SG11202109996R dated Jan. 4, 2023, 5 pages.

* cited by examiner

SYSTEMS AND METHODS FOR PLASMA-BASED REMEDIATION

CROSS-REFERENCE TO RELATED APPLICATIONS

This application is a U.S. National Stage entry of International Application No. PCT/US2020/022172, filed Mar. 11, 2020, which claims the benefit of and priority to U.S. Provisional Patent No. 62/816,694, filed Mar. 11, 2019, each of which is hereby incorporated by reference in its entirety.

TECHNICAL FIELD

The present invention relates to transient plasma-based remediation systems. Specifically, the invention relates to electrode configurations for transient plasma-based remediation systems.

BACKGROUND

Diesel engines are used to transport large merchant shipping vessel across water routes. During operation of the diesel engines, a large amount of exhaust gas is created. The exhaust gas can include a number of harmful substances, such as $NO_x$ compounds. The $NO_x$ compounds emitted by the diesel engines are a substance source of air pollution. Thus, new systems and methods for removing $NO_x$ compounds from diesel exhaust gas are needed.

SUMMARY

According to some implementations of the present disclosure, a system for plasma-based remediation comprises an engine including an exhaust port, the engine emitting exhaust gas from the exhaust port, the exhaust gas including NO molecules and NOx molecules via the exhaust port; a plasma reactor including a reactor tube and an electrode, the reactor tube defining an internal chamber, the electrode being at least partially disposed within the internal chamber inside the reactor tube, the internal chamber being fluidly coupled to the exhaust port of the diesel engine such that the exhaust gas flows into the internal chamber of the plasma reactor from the exhaust port; and a high voltage source electrically coupled to the electrode of the plasma reactor, the high voltage source being configured to deliver electrical pulses to the electrode to thereby form a plasma from the exhaust gas and remove at least a portion of the NO molecules and the NOx molecules from the exhaust gas.

According to some implementations of the present disclosure, a plasma reactor for plasma-based remediation comprises a first reactor tube and a second reactor tube; an input port coupled to a first end of the first reactor tube and a second end of the second reactor tube, the input port being configured to fluidly couple an exhaust port of an engine to the first reactor tube and the second reactor tube such that the exhaust gas can flow through the first reactor tube and the second reactor tube; an output port coupled to the first end of the first reactor tube and the second end of the second reactor tube; a first electrode disposed in the first reactor tube and a second electrode disposed in the second reactor tube; and a high voltage connector coupled to the first reactor tube and the second reactor tube, the high voltage connector being configured to electrically connect both the first electrode and the second electrode to a high voltage source, wherein the high voltage connector is configured to deliver electrical pulses from the high voltage source to both the first electrode and the second electrode, to thereby form a plasma from the exhaust gas flowing through the first reactor tube and the second reactor tube.

According to some implementations of the present disclosure; a system for plasma-based remediation comprises one or more pairs of reactor tubes, each reactor tube of each pair of reactor tubes having an electrode disposed therein; an input port fluidly coupled to the one or more pairs of reactor tubes, the input port being configured to fluidly couple an exhaust port of an engine to the one or more pairs of reactor tubes such that the exhaust gas can flow through the one or more pairs of reactor tubes; one or more high voltage connectors, each high voltage connector being coupled to a respective one of the one or more pairs of reactor tubes, each high voltage connector being electrically connected to the electrode of each reactor tube of the respective one of the one or more pairs of reactor tubes, wherein each high voltage connector is configured to deliver electrical pulses from a high voltage source to the electrode of each reactor tube of the respective one of the one or more pairs of reactor tubes, to thereby form a plasma from the exhaust gas flowing through the one or more pairs of reactor tubes.

BRIEF DESCRIPTION OF THE DRAWINGS

The foregoing and other advantages of the present disclosure will become apparent upon reading the following detailed description and upon reference to the drawings.

While the present disclosure is susceptible to various modifications and alternative forms, specific implementations and implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

While this invention is susceptible of implementation in many different forms, there is shown in the drawings and will herein be described in detail preferred implementations of the invention with the understanding that the present disclosure is to be considered as an exemplification of the principles of the invention and is not intended to limit the broad aspect of the invention to the implementations illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

Large merchant shipping vessels (such as general cargo vessels, container ships, tankers, dry bulk carriers; multi-purpose vessels, refer ships, etc.) operate using way of diesel engines that emit large amounts of exhaust gas. The exhaust gas emissions of these diesel engines can include nitrogen-based $NO_x$ compounds such as nitric oxide (NO), nitrogen dioxide ($NO_2$), and other compounds. These $NO_x$ compounds are considered to be pollutants; and can be harmful to the environment. In order to reduce the harmful emissions from these diesel engines, the exhaust gas of the diesel engines can be remediated to reduce and/or remove the amount of $NO_x$ compounds in the exhaust gas.

Figure 1:
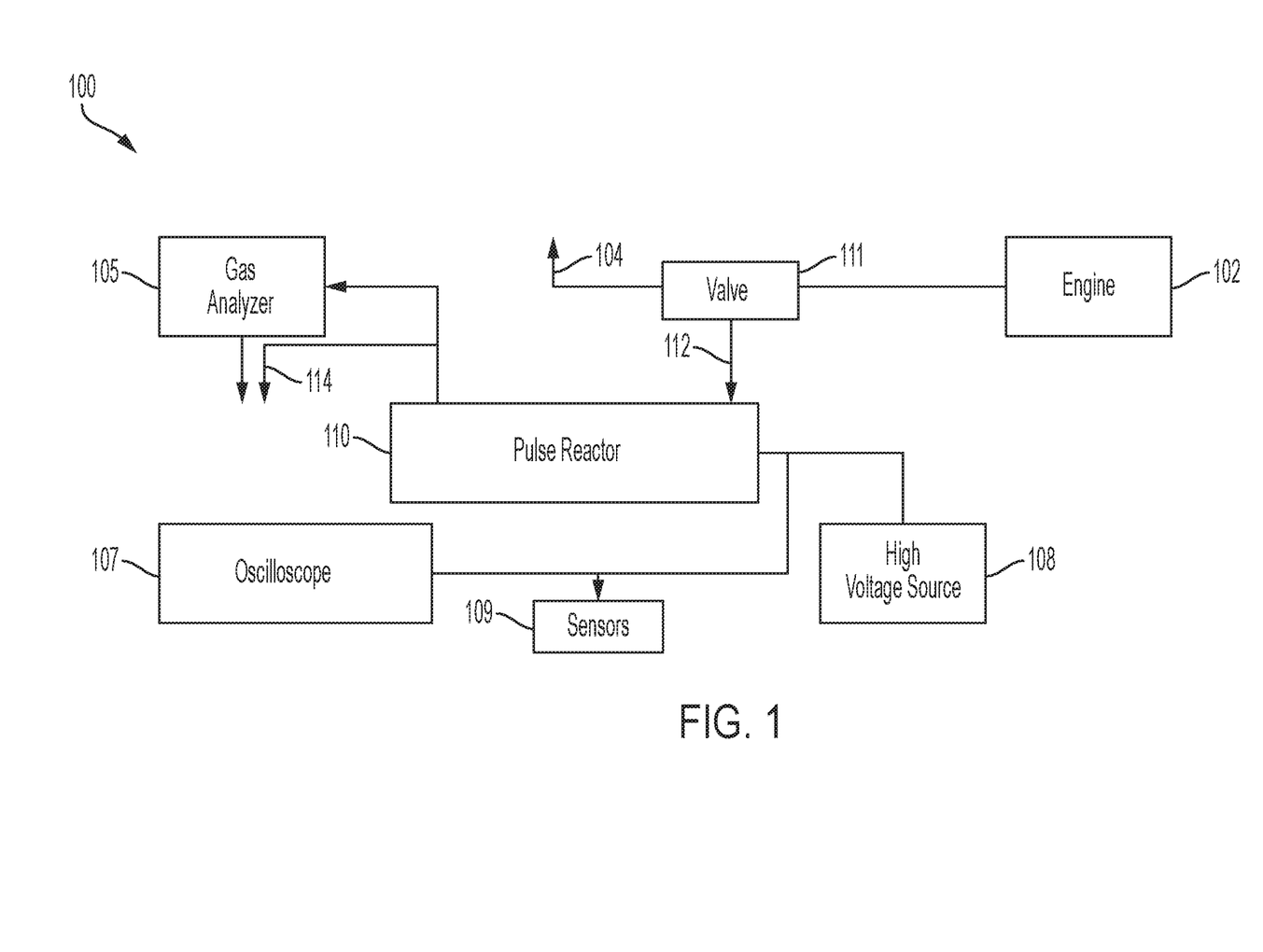
FIG. 1 is a block diagram of a system for plasma-based remediation of diesel exhaust gas, according to some implementations of the present disclosure.

FIG. 1 shows a system 100 for exhaust gas remediation that includes a high voltage source 108 and a plasma reactor 110. During operation, the plasma reactor 110 is fluidly coupled to the output of an engine 102 via a valve 111. The valve 111 is operable to control the amount of exhaust gas emitted by engine 102 that is directed to an input port 112 of the plasma reactor 110. Any gas and/or substances emitted by the plasma reactor can be emitted at output port 114. Exhaust gas not directed to the engine 102 can be sent to an exhaust port 104. In some implementations, the exhaust gas of the engine 102 includes $NO_x$ molecules. In some implementations; the engine 102 is a diesel engine; and the exhaust gas is diesel exhaust. For example, the engine 102 can be the diesel engine of a large merchant shipping vessel. However, the engine 102 can be other types of diesel engines as well, as such as the diesel engines of smaller ships, trucks, sport utility vehicles (SUVs), submarines, trains; or any other type of vehicle that may include a diesel engine, in still other implementations, the engine 102 is a diesel engine of equipment such as a crane, a bulldozer, an excavator, etc. The engine 102 can also be a diesel engine of an electric power plant, or a diesel engine from any other source. In further implementations, the engine 102 is a non-diesel engine.

Figure 5A:
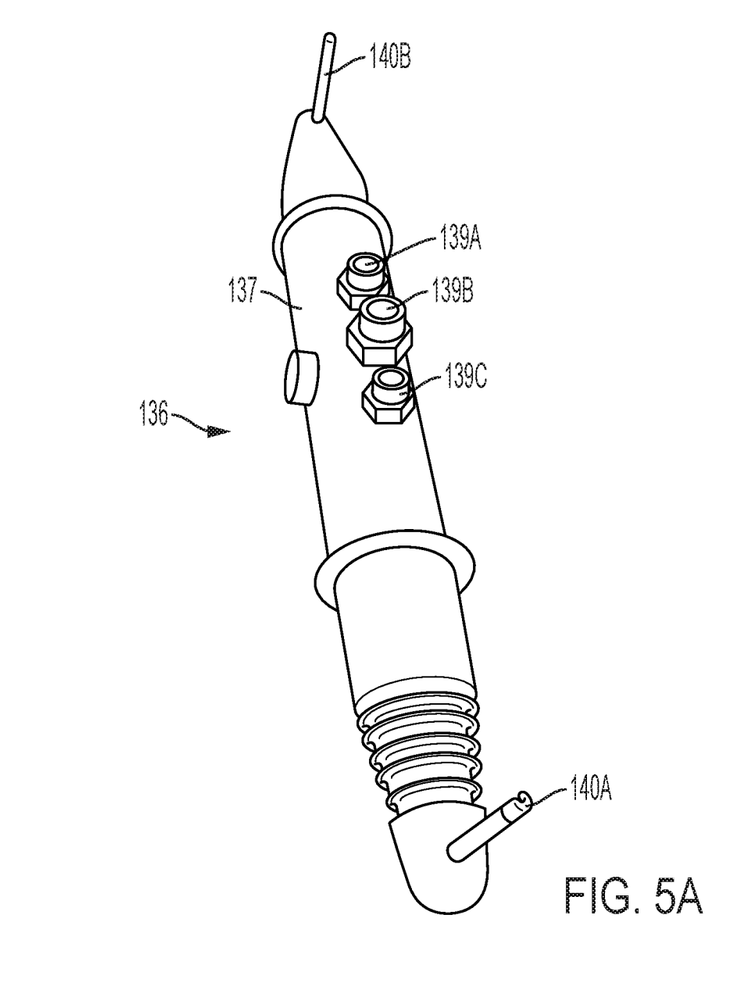
FIG. 5A is a perspective view of a high voltage connector for use in the system of FIG. 1, according to some implementations of the present disclosure.
Figure 5B:
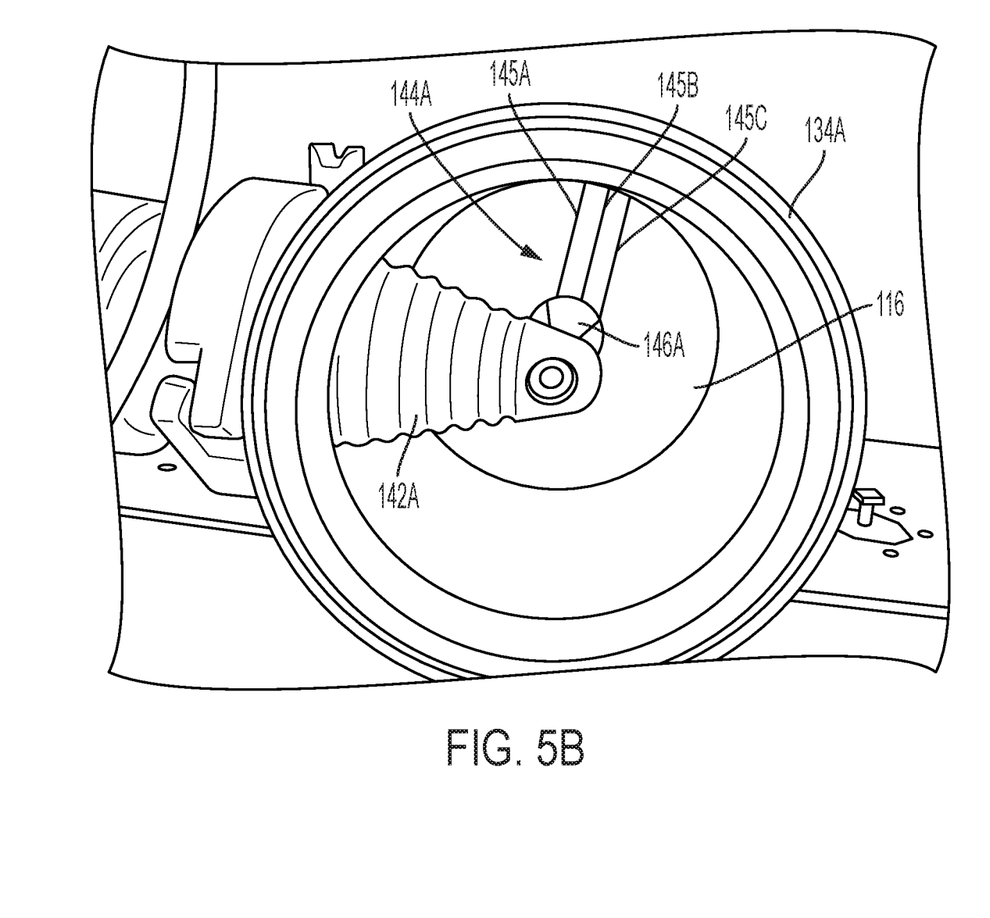
FIG. 5B is a perspective view of a portion of the high voltage connector of FIG. 5A and an electrode positioned inside a plasma reactor, according to some implementations of the present disclosure.

The plasma reactor 110 is generally formed from at least one reactor tube that defines an internal chamber 116 (see FIG. 5B). The internal chamber 116 is fluidly connected to the engine 102 through the input port 112, such that the exhaust gas can flow through the reactor tube. Electrodes are disposed within the internal chamber 116 of the reactor tube. The electrodes are electrically coupled to the high voltage source 108. The high voltage source 108 delivers electrical pulses to the electrodes when the internal chamber 116 contains the exhaust gas from the engine 102, to form a plasma from the exhaust gas. The electrical pulses and the resulting formation of the plasma removes at least a portion of the NO molecules and at least a portion of the NO molecules from the exhaust gas, thereby at least partially remediating the exhaust gas.

In some implementations, additional components can be added to system 100 in order to test the plasma reactor 110. These components can include a gas analyzer 105, an oscilloscope 107, and one or more sensors 109. The gas analyzer 105 can be used to analyze the gas emitted from the output port 114 of the plasma reactor 110. The sensors 109 can be coupled to the high voltage source 108, and are used to measure the voltage and current of the pulses being fed into the plasma reactor 110. The sensors 109 are used to measure the derivatives of the electrical field and magnetic field of these pulses. The outputs of the sensors 109 are sent to integrators coupled to the oscilloscope 107 to obtain oscilloscope waveforms, which are numerically reconstructed to form the actual voltage and current waveforms. The oscilloscope 107 can be housed in an electromagnetically compatible (EMC) cabinet, or another suitable enclosure, to protect the oscilloscope from any electromagnetic interference from the plasma reactor. In some implementations, some or all components of system 100 are grounded to aid in reducing electromagnetic interference issues.

In some implementations, one of the sensors 109 measures only the electric field D, and is positioned near a cable connecting the high voltage source 108 and the plasma reactor 110. The sensor can be formed from a metal plate placed adjacent to the cable, such that a capacitance $C_D$ is formed. The voltage of the pulses from the high voltage source 108 are thus given by:

$$V_D = Z_{cable} C_D \frac{dV_{HV}}{dt},$$

where $Z_{cable}$ is the impedance of the cable (for example, 50 ohms), $V_{HV}$ is the voltage waveform that is reconstructed, and $V_D$ is the output of the electric field sensor 109.

In some implementations, one of the sensors 109 measures only the electric field B, and is positioned near the cable connecting the high voltage source 108 and the plasma reactor 110. The sensor can be formed from a single metal loop placed adjacent to the cable. The magnetic field generated by current in the cable couples into the metal loop via a mutual inductance $M_B$ between the metal loop and the cable. The resulting change in magnetic flux in the metal loop induces a voltage across the loop, given by:

$$V_B = M_B \frac{dI_{HV}}{dt},$$

where $I_{HV}$ is the current waveform that is reconstructed, and $V_B$, is the output of the magnetic field sensor 109.

The full numerical reconstruction of the voltage and current waveforms is given by:

$$V_{HV} = \frac{1}{C_D R_2}\left[R_1 C_1 V_{D,int} + \left(1 + \frac{R_1}{Z_0}\right)\int V_{D,int} dt\right], \text{ and}$$

$$I_{HV} = \frac{1}{M_B}\left[R_1 C_1 V_{B,int} + \left(1 + \frac{R_1}{Z_0}\right)\int V_{B,int} dt\right],$$

where $Z_0$ is the input impedance of the oscilloscope 107, and both $C_D$ and $M_B$ are predetermined calibration values. The final integration term is a correction term for the impedance of the oscilloscope 107.

Figure 2:
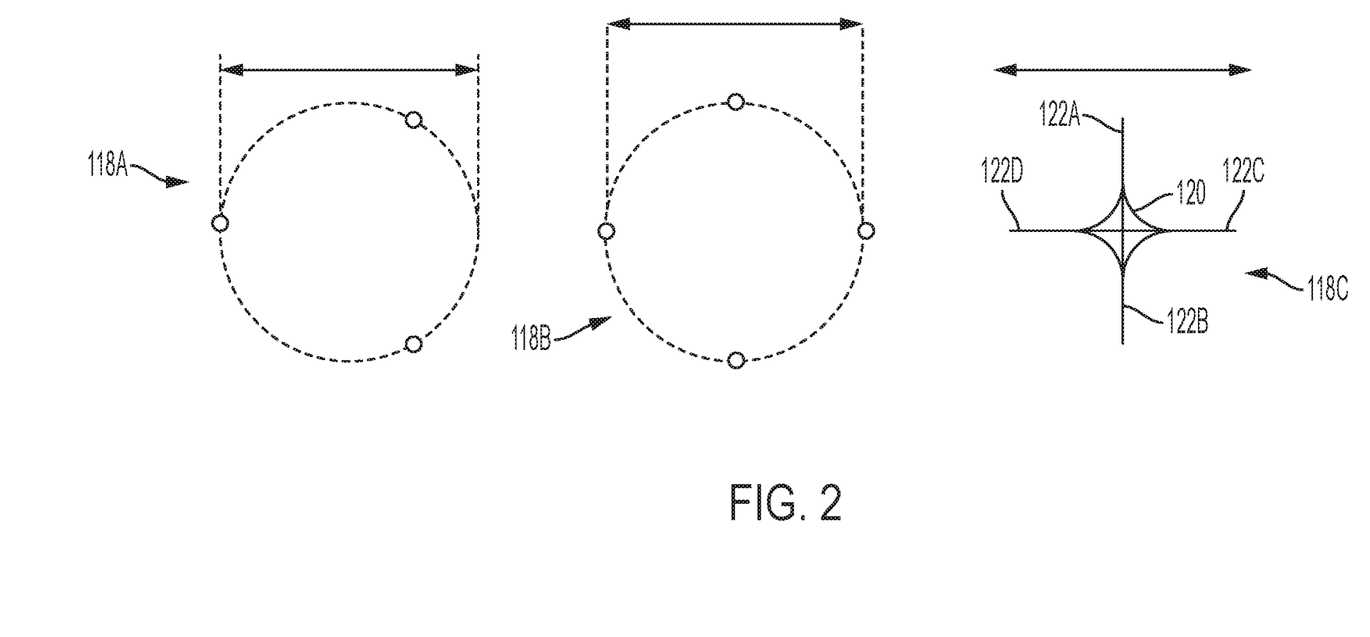
FIG. 2 shows profile views of a three-wire electrode, a four-wire electrode, and an extruded electrode; that can all be used with the system of FIG. 1, according to some implementations of the present disclosure.

FIG. 2 illustrates various implementations and configurations of the electrodes, which can be solid extruded electrodes, or can be formed from a number of wires. The wire-based electrodes can be 1-wire electrodes, 2-wire electrodes 3-wire electrodes, 4-wire electrodes, 5-wire electrodes, 6-wire electrodes, or any other number of wires. The electrodes can include two different types of electrodes. Moreover, the plasma reactor 110 may include one electrode, or three or more electrodes. Shown in FIG. 2 are a 3-wire electrode 118A, a 4-wire electrode 118B, and an extruded electrode 118C. The multiple wire-based electrodes (such as 3-wire electrode 118A and 4-wire electrode 118B) can have a cross-section that is generally defined as the diameter of a circle connecting all of the wires of the electrode, as shown. The cross-section of the extruded electrode 1180 has a central portion 120, and four arms 122A-122D. The cross-section of the extruded electrode 118C is defined as the distance between the ends of two opposing arms, such as arms 122A and 122B, or arms 122C and 122D. In some implementations, the 3-wire electrode 118A and the 4-wire electrode 118B have cross-sections of about 2.0 inches, about 2.25 inches, or about 2.5 inches. In other implementations, the 3-wire electrode 118A and the 4-wire electrode 118B have cross-sections of between about 1.0 inches and about 5.0 inches. Other electrode types and configurations are also contemplated. For example, the extruded electrode 118C could have more or less than the four arms 122A-122D, and could also have a different shape entirely. In other implementations, the cross-section of the electrodes can be between about 0.4 inches and about 1.1 inches. Further, the electrodes can have an impedance of between about 70 ohms and about 300 ohms.

Figure 3A:
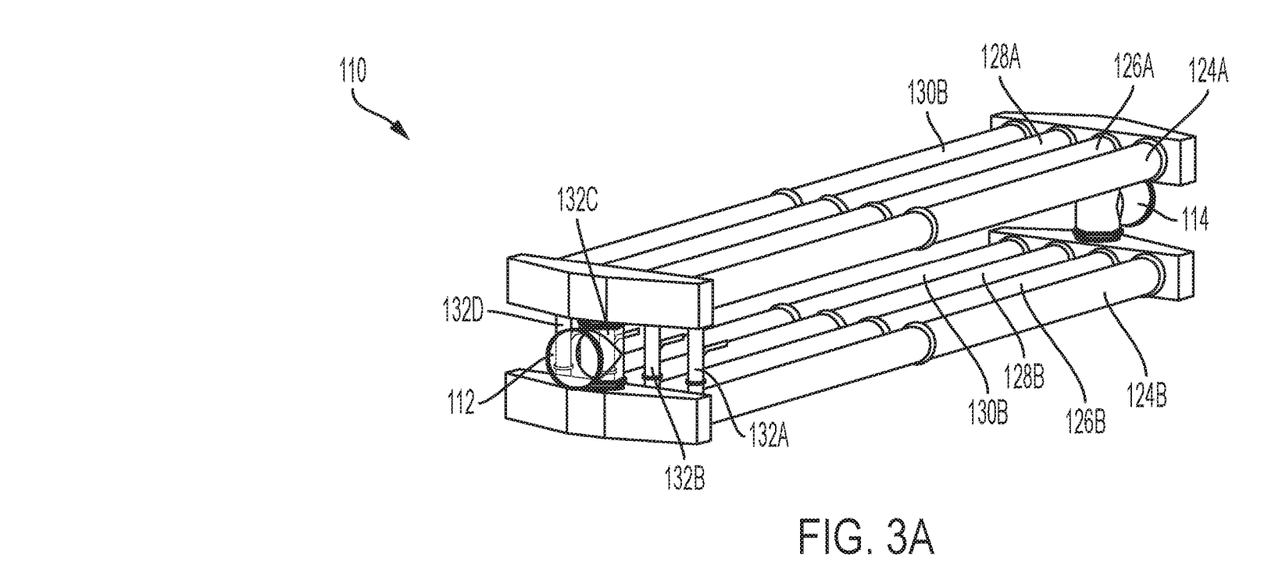
FIG. 3A is a perspective view of a plasma reactor including four pairs of reactor tubes and four high voltage connectors for use in the system of FIG. 1, according to some implementations of the present disclosure.
Figure 3B:
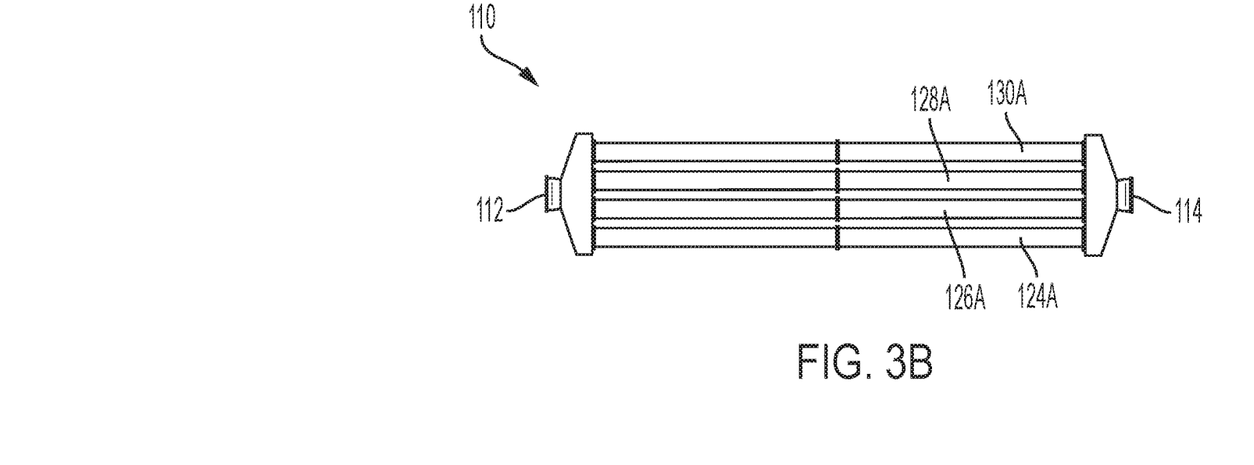
FIG. 3B is a top plan view of the plasma reactor of FIG. 3A, according to some implementations of the present disclosure.

FIG. 3A illustrates a perspective view of one implementation of the plasma reactor 110, while FIG. 3B illustrates a top plan view of one implementation of the plasma reactor 110. In this implementation, the plasma reactor includes a first pair of reactor tubes 124A and 124B, a second pair of reactor tubes 126A and 126B, a third pair of reactor tubes 128A and 128B, and a fourth pair of reactor tubes 130A and 130B. Each reactor tube 124A-130B defines a hollow internal chamber (such as hollow internal chamber 116 shown in FIG. 5B) in which an electrode can be disposed. The plasma reactor 110 in FIGS. 3A and 3B also include four high voltage connectors 132A-132D.

High voltage connector 132A is coupled to the electrodes positioned inside the first pair of reactor tubes 124A, 124B. High voltage connector 13213 is coupled to the electrodes positioned inside the second pair of reactor tubes 126A, 126B. High voltage connector 1320 is coupled to the electrodes positioned inside the third pair of reactor tubes 128A, 128B. High voltage connector 132D is coupled to the electrodes positioned inside the fourth pair of reactor tubes 130A, 130B. The high voltage connectors 132A-132D deliver electrical pulses from the high voltage source 108 to the electrodes positioned inside the reactor tubes 124A-130B. The input port 112 and the output port 114 are positioned at opposite ends of the reactor tubes 124A-130B, and are both fluidly coupled to the internal chambers of all of the reactor tubes 1284-130B, so that the exhaust gas from the engine 102 can flow through the plasma reactor. In some implementations, each high voltage connector 132A-132D is coupled to the same high voltage source 108. In other implementations, each high voltage connector 132A-132D is coupled to its own respective high voltage source 108.

Figure 4A:
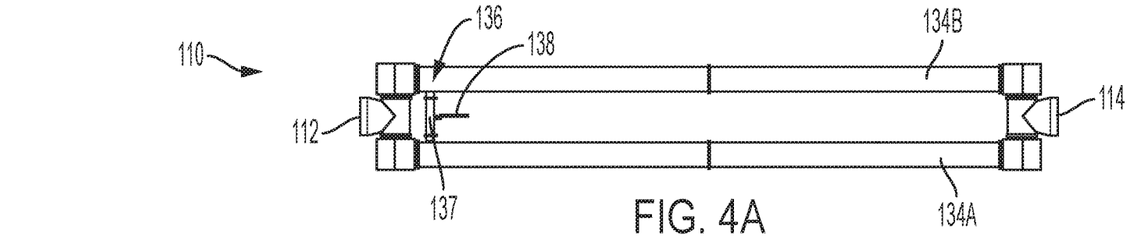
FIG. 4A is a top plan view of a pair of reactor tubes for use in the system of FIG. 1, according to some implementations of the present disclosure.

FIG. 4A shows a top plan view of a pair of reactor tubes 134A and 134B. The input port 112 is coupled to one end of both reactor tubes 134A, 134B. The output port is coupled to the other end of both reactor tubes 134A, 134B. A single high voltage connector 136 is coupled to both the first reactor tube 134A and the second reactor tube 134B. The reactor tubes 134A and 1:34B may be the same as or similar to reactor tubes 124A-130B. The high voltage connector 136 may be the same as or similar to high voltage connectors 132A-132D. The high voltage connector 136 generally extends between the reactor tubes 134A, 134B in a direction that is perpendicular to the direction along which the reactor tubes 134A, 134B extend.

In some implementations, the pair of reactor tubes 134A, 134B and the high voltage connector 136 form an individual plasma reactor 110 on their own. In other implementations, the pair of reactor tubes 134A, 134B and the high voltage connector 136 are components of a larger plasma reactor 110, such as the plasma reactor 110 illustrated in FIGS. 3A and 3B. The high voltage connector 136 includes a housing 137 and a cable 138 extending from the housing 137. A distal end of the cable 138 electrically connects to the high voltage source 108, while the proximal end of the cable extends into the housing 137 of the high voltage connector 136.

Figure 4B:
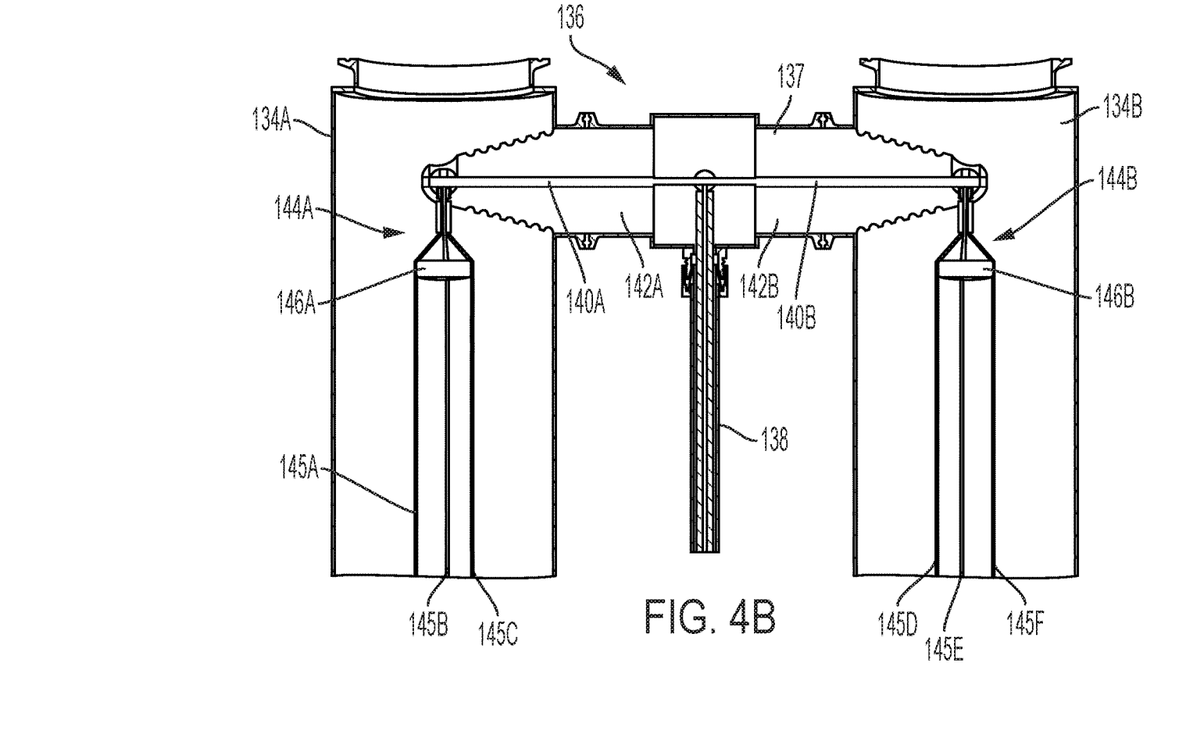
FIG. 4B is a cross-section of one end of the pair of reactor tubes of FIG. 4A, according to some implementations of the present disclosure.

FIG. 4B shows a cross-section of one end of the plasma reactor 110 of FIG. 4A, showing the inside of the reactor tubes 134A, 134B, and the inside of the high voltage connector 136. The high voltage connector 136 includes two insulating members 142A, 142B extending from the housing 137. A first portion of each insulating member 142A, 142B is disposed within the housing 137. A second portion of insulating member 142A extends from the housing 137 and is positioned inside the internal chamber of reactor tube 134A, while the second portion of insulating member 142B extends from the housing 137 and is positioned inside the internal chamber of reactor tube 134B. The first portion of each insulating member 142A, 142B has a generally cylindrical shape. The second portion of each insulating member 142A, 142B is generally cone-shaped, and tapers down to the end that is disposed in the respective reactor tube 134A, 134B.

The cable 138 extends into the housing 137, where it is electrically connected to into two separate electrically conductive members 140A, 140B. Electrically conductive member 140A extends through the interior of the insulating member 142A to the tapered end disposed in reactor tube 134A. Electrically conductive member 140B extends through the interior of the insulating member 142B to the tapered end disposed in reactor tube 134B. Thus, the electrically conductive members 140A, 140B generally extend perpendicular to the length of the reactor tubes 134A, 134B.

An electrode 144A is coupled to electrically conductive member 140A, and extends along the length of the internal chamber of reactor tube 134A. Similarly, an electrode 144B is coupled to electrically conductive member 140B, and extends along the length of the internal chamber of reactor tube 134B. Electrode 144A is formed from wires 145A, 145B, and 145C. Electrode 144B is formed from wires 145D, 145E, and 145F. Spacers 146A, 146B may be coupled to electrodes 144A, 144B, respectively. Spacers 146A, 146B aid in maintaining the position of the electrodes 144A, 144B within the internal chambers of the respective reactor tubes 134A, 134B, and prevent the electrodes 144A, 144B from contacting the interior surface of the reactor tubes 134A, 134B. Electrodes 144A and 144B can be 3-wire electrodes (such as electrode 118A), 4-wire electrodes (such as 118B), extruded electrodes (such as electrode 118C), or any other suitable type or shape of electrode. When the electrodes are multi-wire electrodes, the spacers 146A, 146B also aid in maintaining separation of the wires. In some implementations, the spacers 146A, 146B are made of an electrically insulating material, such as fiberglass.

The arrangement of the high voltage connector 136 and the electrodes 144A, 144B can be used for any implementation of the plasma reactor 110. For example, the plasma reactor 110 can include the four pairs of reactor tubes 124A-130B as shown in FIGS. 4A and 4B. The plasma reactor 110 could also include a single reactor tube coupled to the input port 112 and the output port 114, a single pair of reactor tubes coupled to the input port 112 and the output port 114, or any number of reactor tubes coupled to any number of input ports 112 and any number of output ports 114.

FIG. 5A shows a perspective view of the high voltage connector 136 without the cable 138 attached. In some implementations, the housing 137 includes one or more ports 139A, 13913, 139C that are open to the interior of the housing. Ports 139A, 13913, and 139C can be used to allow coolant or other fluids to circulate within the housing 137, in order to cool the high voltage connector 136 and maintain the high voltage connector 136 at a desired temperature. In some implementations, the coolant is oil. In some implementations, the electrically conductive members 140A, 140B extend out of their respective insulating members 142A, 142B parallel to the length of the reactor tubes 134A, 134B. Thus, the electrically conductive members 140A, 140B can have a right-angled shape, e.g., an "L" shape.

FIG. 5B shows an end view of reactor tube 134A with an end cap removed, such that the internal chamber 116 is visible. As shown, the electrode 144A extends away from the insulating member 142A toward the opposite end of the internal chamber 116. In the implementation shown in FIG. 5B, electrode 144A is a 3-wire electrode formed from wires 145A, 146B, 145C, and spacer 146A aids in maintaining separation of the three wires 145A, 145B, 145C.

Figure 5C:
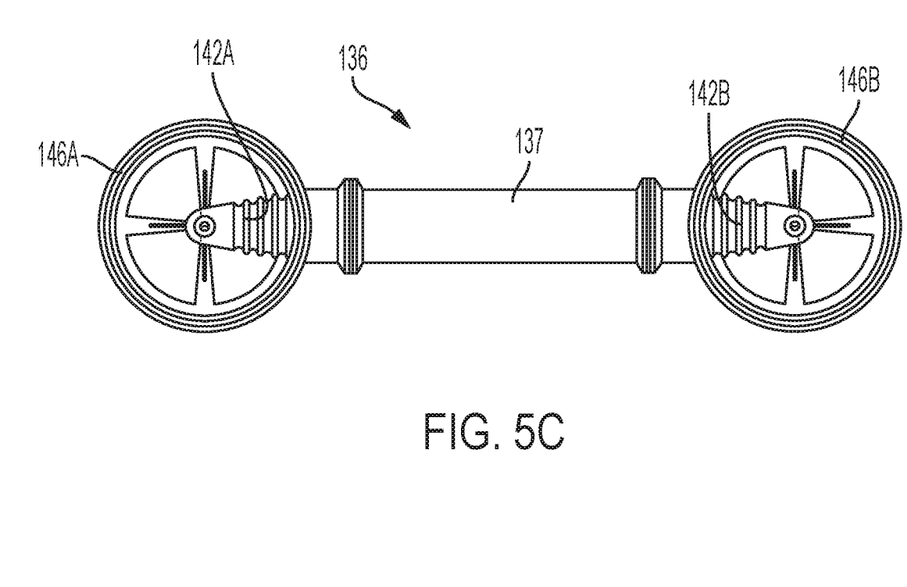
FIG. 5C is a plan view of the high voltage connector of FIG. 5A coupled to two spacers, according to some implementations of the present disclosure.

FIG. 5C shows the high voltage connector 136 from the opposite side as compared to FIG. 5B. In the implementation illustrated in FIG. 5C, the spacers 146A, 146B have large circular shapes, with an outer diameter generally equal to an inner diameter of the reactor tubes 134A, 134B. These types of spacers 146A, 146B are generally used with extruded electrodes 118C.

Figure 6A:
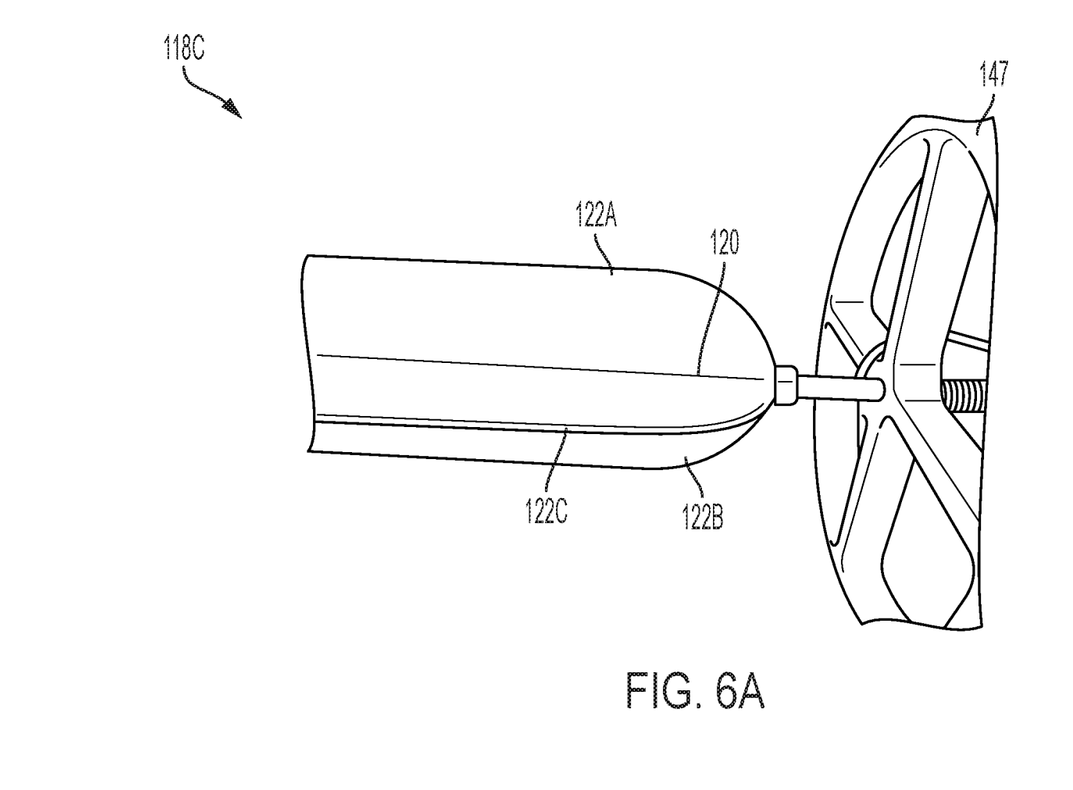
FIG. 6A is a first perspective view of an extruded electrode coupled to a spacer, for use in the system of FIG. 1, according to some implementations of the present disclosure.
Figure 6B:
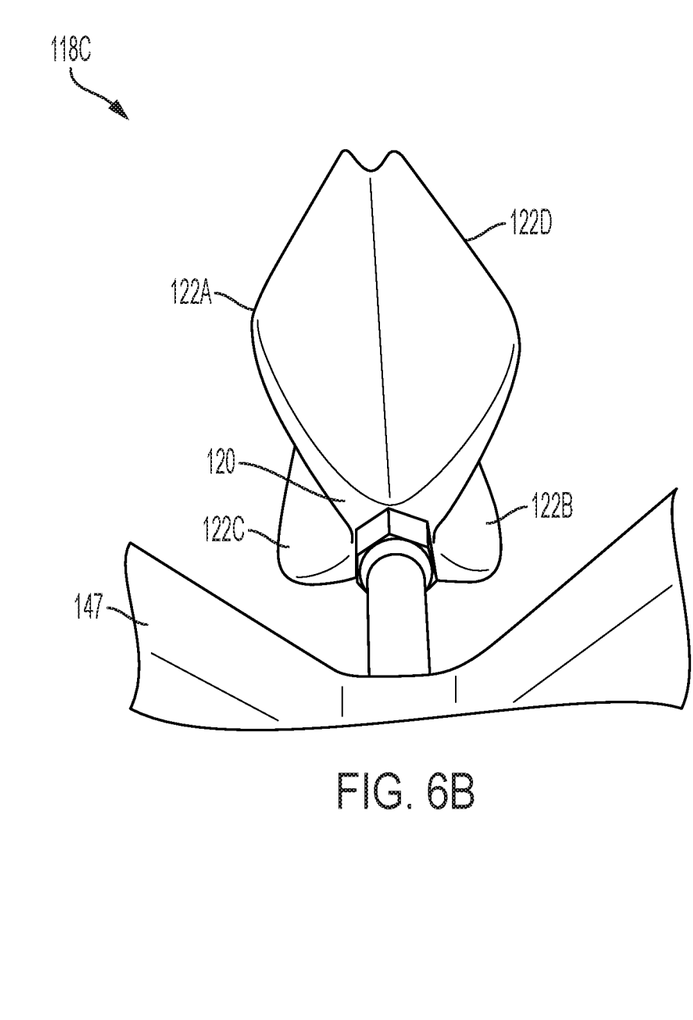
FIG. 6B is a second perspective view of the extruded electrode and the spacer of FIG. 6A, according to some implementations of the present disclosure.
Figure 6C:
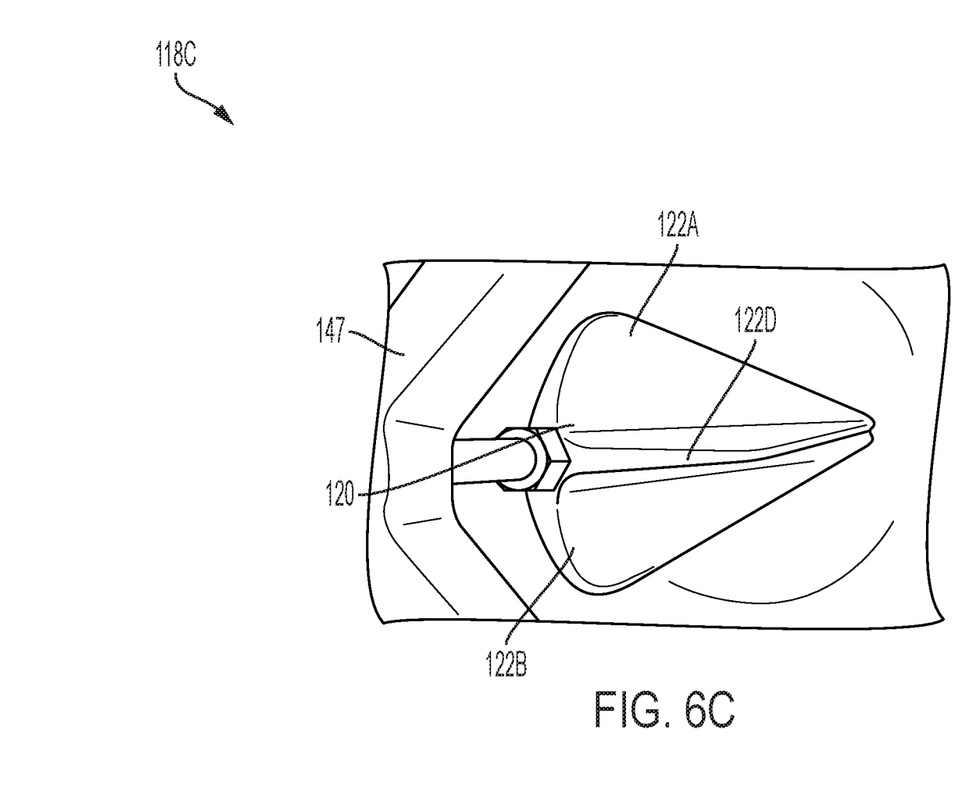
FIG. 6C is a third perspective view of the extruded electrode and the spacer of FIG. 6A, according to some implementations of the present disclosure.

FIGS. 6A, 6B, and 6C all show an extruded electrode 118C with a spacer 147 (which can be the same as or similar to any of the spacers 146 discussed herein). As shown, extruded electrode 118C is formed from four arms 122A-122D extending from a central portion 120. The extruded electrode 118C is mounted to an electrically conductive member 141 (which can be the same as or similar to electrically conductive members 140A, 140B). The electrically conductive member 141 extends through the center of the spacer 147, and is used to conduct pulses from the high voltage source 108 to the electrode 118C.

Figure 7:
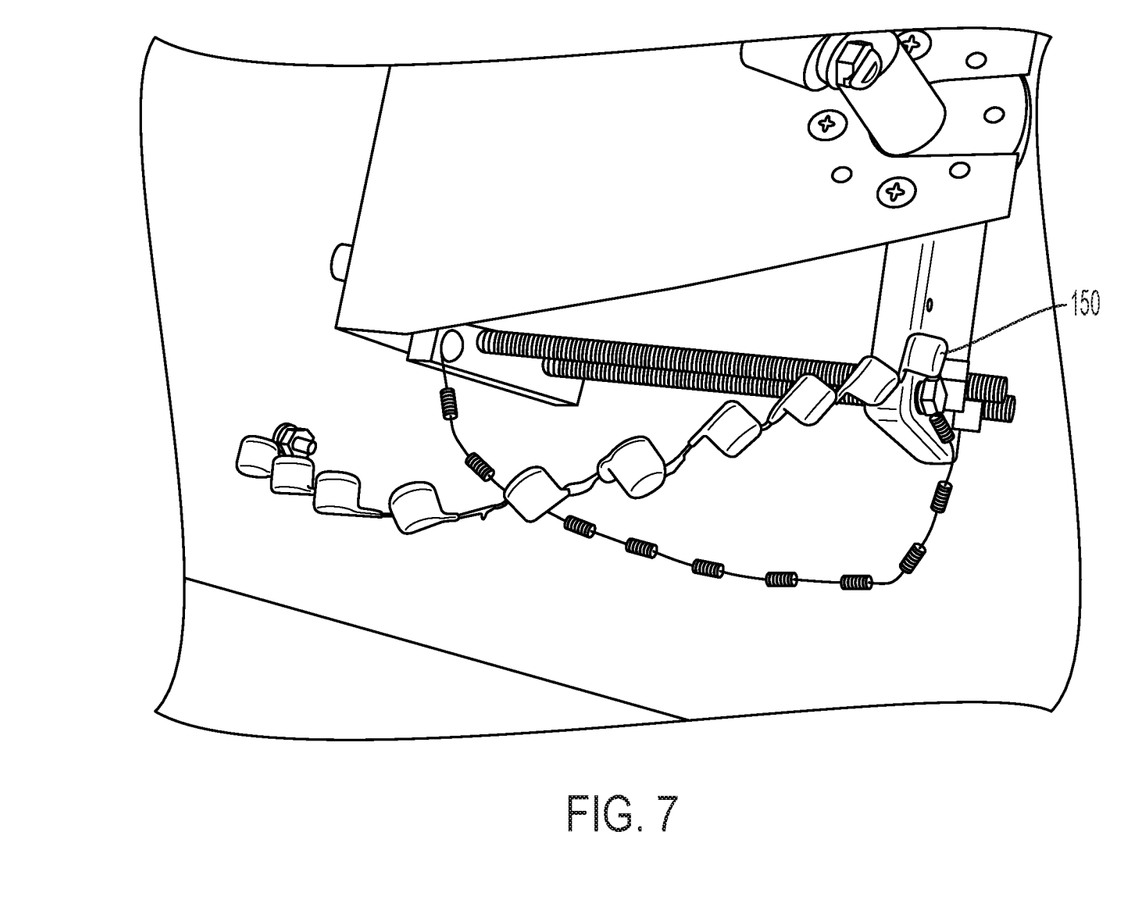
FIG. 7 is a perspective view of a bypass network of capacitors for use in the system of FIG. 1, according to some implementations of the present disclosure.

FIG. 7 shows a bypass network 150 that can be electrically coupled in parallel with the cable 138 of the high voltage connector 136. During use, the plasma reactor 110 can generate large amounts of electromagnetic interference (EMI) due to the operation of the high voltage source 108. In certain situations, a large amount of electrical energy can be reflected back to the high voltage source 108, such as when the connection to one of the electrodes 144A, 144B is short-circuited, or when the high voltage source 108 and the plasma reactor 110 are impedance mismatched. The reflected energy can be absorbed by the output of the high voltage source 108 (which could be, for example, a diode stack). To avoid this issue, the bypass network 150 can be electrically connected in parallel with the output of the high voltage source 108 and the high voltage connector 136. The bypass network 150 can act as a sink and absorb any reflected electrical energy. In the illustrated implementation, the bypass network 150 is one or more capacitors electrically connected in series. Other types of bypass networks 150 can also be utilized.

During operation, system 100 has a total system efficiency defined as $\eta_{system} = \eta_{source} \times \eta_{reactor} \times \eta_{plasma}$. $\eta_{source}$ is the electrical efficiency at which electrical energy is taken from the electricity grid (or other ultimate source of electrical energy) by the high voltage source 108 and converted into short pulses. $\eta_{reactor}$ is the electrical efficiency at which the energy of the pulses is dissipated by the plasma formed in the plasma reactor 110, and can be defined as $$\eta_{source} = \frac{E_{plasma}}{E_{pulse}},$$

where $E_{plasma}$ is the energy dissipated by the plasma, and $E_{pulse}$ is the total available energy in the pulse. $\eta_{plasma}$ is the chemical efficiency of the plasma, and is a measure of the amount of energy used by the plasma that is converted into chemically active species. The total system efficiency $\eta_{system}$ is the product of all three efficiencies.

The reactor efficiency $\eta_{reactor}$ is influenced by the electric field strength in the plasma reactor 110, and the impedance matching of the plasma reactor 110. The impedance matching of the plasma reactor 110 determines how much of the pulse from the high voltage source 108 enters the plasma reactor 110. In a perfectly matched system, the impedance of the cable 138 delivering the pulses matches the impedance of the plasma reactor 110, and the entire pulse enters the plasma reactor 110. When there is some amount of mismatch in the impedance, the pulse partially reflects off the plasma reactor 110, which can lead to a loss of energy and high voltage stress on the system. In some implementations of system 100, the cable 138 has an impedance of about 50 ohms, and each of the electrically conductive members 140A, 140B connected to the high voltage source 108 through the cable 138 have an impedance of about 100 ohms. In these implementations, a single high voltage source 108 is used to generate pulses for each pair of electrodes.

The reflectiveness of the system 100 is given by $$R = \frac{Z_{reactor} - Z_{cable}}{Z_{reactor} + Z_{cable}},$$

where $Z_{cable}$ is the impedance of the cable 138 and $Z_{reactor}$ is the impedance of the plasma reactor 110. For a perfectly matched system R=0, and there is no reflection. For a mismatched system however, there is some degree of reflection. The maximum voltage stress $V_{max}$ of the system 100 is the sum of the incoming pulse voltage and the reflected pulse voltage, and is generally given by $V_{max}=(1+R)V_{peak}$, where $V_{peak}$ is the applied peak voltage.

The effectiveness of the system 100 at removing NO molecules and $NO_x$ molecules is measured by comparing the initial and final concentrations of NO and $NO_x$. This is measured as:

$$NO_{remediation} = 100\% \times \frac{NO_{initial} - NO_{final}}{NO_{initial}}$$

$$NO_{x,remediation} = 100\% \times \frac{NO_{x,initial} - NO_{x,final}}{NO_{x,initial}}$$

The NO removal efficiency of the system 100 is defined as how efficient the formed plasma removes NO and is measured in mol/kWh. The NO removal efficiency is measured by the following equation:

$$NO_{rem,eff} = \frac{\Delta NO \times 3.6}{V_m \epsilon},$$

$\Delta NO$ is the removed concentration of NO (in ppm), $V_m$ is the molar volume (in L/mol, dependent on temperature) and c is the energy density (in J/L). The energy density is given by:

$$\epsilon = \frac{f_{rr} E_{plasma} \times 60}{F}.$$

Here, $f_{rr}$ is the pulse repetition rate (in Hz), $E_{plasma}$ is the dissipated energy in the plasma per pulse, and F is the gas flow rate (in L/min).

The overall efficiency of the system 100 is given by the following equation:

System efficiency=Reactor efficiency×$NO_{rem,eff}$

The system 100 is operated according to a variety of settings, including engine loading, engine speed, pulse source voltage, pulse source repetition rate, flow through the plasma reactor 110, and electrode type and geometry. The engine speed can be between about 400 rpm and about 1,000 rpm, between about 1,000 rpm and about 1,800 rpm, between about 400 rpm and about 1,800 rpm, about 400 rpm, about 1,000 rpm, or about 1,800 rpm. The pulse source voltage can be about 250 volts, about 300 volts, about 325 volts, about 350 volts, or between about 250 volts and about 350 volts. The pulse source repetition rate can be about 100 Hz, about 500 Hz, about 1000 Hz, about 1,500 Hz, about 2,500 Hz, or generally any range between any two of these values. In some implementations, the average electrical reactor efficiency (e.g., $\eta_{reactor}$), can be between about 70% and about 90%, between about 78% and about 86%, between about 80% and about 90%, While the present invention has been described with reference to one or more particular implementations, those skilled in the art will recognize that many changes may be made thereto without departing from the spirit and scope of the present invention. Each of these implementations and obvious variations thereof is contemplated as falling within the spirit and scope of the invention. It is also contemplated that additional implementations according to aspects of the present invention may combine any number of features from any of the implementations described herein.

What is claimed is:

1. A system for chemically altering an $NO_x$ concentration of an exhaust stream, comprising:
   an exhaust inlet port;
   an exhaust outlet port;
   first and second parallel elongate conduits fluidly coupling the exhaust inlet port to the exhaust outlet port;
   a pulse voltage source;
   a voltage connector disposed between the first and second parallel elongate conduits, said voltage connector electrically coupled to the pulse voltage source, said voltage connector comprising a first tapered, insulating end protruding into an interior of the first elongate conduit and a second tapered, insulating end protruding into an interior of the second elongate conduit;
   a first electrically conductive member extending through the first tapered, insulating end and a second electrically conductive member extending through the second tapered, insulating end; and
   a first electrode aligned axially within the first elongate conduit and electrically coupled to the first electrically conductive member and a second electrode aligned axially within the second elongate conduit and electrically coupled to the second electrically conductive member;
   wherein said pulse voltage source is configured to produce a transient plasma within the first and second elongate parallel conduits; and
   wherein said transient plasma is adapted to remove a portion of $NO_x$ flowing from the exhaust inlet port to the exhaust outlet port.

2. The system of claim 1, further comprising a sensor configured to measure a property of the pulse voltage source.

3. The system of claim 2, wherein the property is voltage.

4. The system of claim 2, wherein the property is current.

5. The system of claim 2, wherein the property is an electric field generated.

6. The system of claim 1, wherein the first and second electrodes have an impedance of between 70 ohms (70Ω) and 300 ohms (300Ω).

7. The system of claim 1, wherein the first and second electrically conductive members extend from their respective tapered insulating ends and form an "L" shape.

8. The system of claim 1, further comprising a bypass network electrically coupled to the pulse voltage source in parallel with the voltage connector.

9. The system of claim 8, wherein the bypass network is a plurality of capacitors electrically connected in series.

10. The system of claim 1, wherein the pulse voltage source produces a voltage of between 250 volts (250V) and 350 volts (350V).

11. The system of claim 1, wherein a frequency of the pulse voltage source is about 1000 (1000 Hz).

* * * * *